United States Patent [19]
Gislason

[11] Patent Number: 6,064,123
[45] Date of Patent: May 16, 2000

[54] HORIZONTAL AXIS WIND TURBINE

[76] Inventor: Nils Erik Gislason, Lyngholt 2, Akuneyri, Iceland

[21] Appl. No.: 09/051,554
[22] PCT Filed: Oct. 13, 1995
[86] PCT No.: PCT/IB95/00871
  § 371 Date: Apr. 10, 1998
  § 102(e) Date: Apr. 10, 1998
[87] PCT Pub. No.: WO97/13979
  PCT Pub. Date: Apr. 17, 1997

[51] Int. Cl.[7] ..................................................... F03D 5/04
[52] U.S. Cl. ................................................ 290/55; 290/44
[58] Field of Search ........................................ 290/44, 55

[56] References Cited

U.S. PATENT DOCUMENTS

| | | |
|---|---|---|
| 717,939 | 1/1903 | Hernandez . |
| 1,015,416 | 1/1912 | Bennett . |
| 1,233,232 | 7/1917 | Heyroth . |
| 1,944,239 | 1/1934 | Honnef ........................................ 290/55 |
| 4,289,970 | 9/1981 | Deibert ....................................... 290/44 |
| 4,302,684 | 11/1981 | Gogins ........................................ 290/55 |
| 4,323,331 | 4/1982 | Schachle et al. ............................ 416/9 |
| 4,330,714 | 5/1982 | Smith ......................................... 290/55 |
| 5,299,913 | 4/1994 | Heidelberg ............................. 416/197 A |

*Primary Examiner*—Nicholas Ponomarenko
*Attorney, Agent, or Firm*—Richard C. Litman

[57] ABSTRACT

A horizontal axis wind turbine comprises a rotor-supporting framework, a multi-vaned rotor, an electricity-generating stator, and a rotation track. The supporting framework is constructed with a plurality of triangular sub-units. The rotor has a plurality of vanes projecting therefrom. The vanes have adjustable pitch and are encircled by a rim having a plurality of magnets. Wind induces rotation of the rim. The stator is essentially stationary and is mounted on the framework opposite the rim. As magnets on the rotating rim pass by the stator, electricity is generated. The stator uses the pull of the magnets to automatically adjust itself to align with the rotating rim. The framework is mounted on the rotation track so that the framework can continually be adjusted to maximize wind-induced rotation of the rotor.

4 Claims, 4 Drawing Sheets

HORIZONTAL AXIS WIND TURBINE

BACKGROUND OF THE INVENTION

1. Field of the Invention

The present invention relates generally to turbines for creation of electrical power, and more specifically to horizontal wind turbines.

2. Description of the Prior Art

Throughout history, civilization has yearned for better and more efficient sources of power generation. Fossil fuels have not always locally available and have been expensive to transport over long distances. Nuclear power has produced unwanted radioactive waste and carries potential for apocalyptic accidents. Solar power's promise has been dimmed by the high cost of equipment necessary to utilize the sun's energy. Hydroelectric power generation requires flowing water and, often, disruption of normal paths of water. Seemingly, the wind is the only readily available and safe source of power.

Though developed centuries ago, wind-powered devices are thus still a favored source of power generation today. The windmill, once used to grind grain, has been adapted to produce electricity. Windmills have evolved into wind turbines wherein the wind's power no longer turns stone wheels atop grain, but rather passes magnets alongside wire coils to generate electricity. In wind turbines, the wind's force pushes the blades of a wheel which act as the rotors of a generator.

Over time, wind turbines have been developed to work more efficiently in compensating for many of the natural obstacles impeding consistent energy recovery from the wind. For example, shifts in wind direction can stop a fixed wind turbine; thus, wind turbines have been constructed with various rotational methods so that the wind will strike the blade in the optimum fashion. Further, wind turbines have been developed whereby fluctuations in wind velocity leave the wind turbine relatively unaffected in both structural integrity and power generation potential.

Horizontal axis wind turbine generators have proven very effective in producing electricity from the wind. Typically, they consist of a nacelle mounted atop a tall tower. The nacelle houses a transmission to increase a rotor's rotational speed to the speed of an electrical generator; some means of power smoothing is necessary to compensate for cyclic fluctuation and wind gusts. The nacelle also incorporates a strong shaft to carry a large rotor hub and blades. Turning in a horizontal plane, the nacelle adjusts to the direction of the wind current to face the rotor into the oncoming wind.

Horizontal axis wind turbines are not without their problems, however. The transmission requires regular maintenance and repair; a major expense in horizontal axis wind turbine design is the transmission. Furthermore, the main shaft must withstand not only the load of the rotor hub and blades, but also the load from oscillations and wind gusts. Additionally, expenses are incurred in reinforcing the tower structure supporting the heavy nacelle.

Another problem with horizontal axis wind turbines is maximizing rotor diameter and the number of rotor blades. Horizontal wind turbine generators usually have a rotor diameter of at least 20 meters, and they are designed with only two or three blades. As a general rule, if a wind turbine has a large number of blades, the rotor's solidity is increased, rotation speed is slower, and less noise is produced. Horizontal axis wind turbines have employed few blades, however, because the design and construction of conventional blades is expensive. Moreover, the increased rotor diameter of horizontal axis wind turbines makes blade control and structural integrity difficult at high wind speeds.

The need arises for a horizontal axis wind turbine of simple construction, low production cost, low maintenance cost, and sound structural integrity.

U.S. Pat. No. 145,970, issued to Emilius Sanderson, on Dec. 30, 1873, shows the concept of supporting two sides of a horizontal axis of a wind-wheel.

U.S. Pat. No. 273,182, issued to Homer B. Sprague, on Feb. 27, 1883, and U.S. Pat. No. 5,161,952, issued to Alfred J. Eggers, Jr., on Nov. 10, 1992, show use of a rim having spokes to support blades. These patents also show an aerodynamic blade shape, as well as the use of blades threaded onto spokes.

U.S. Pat. No. 282,122, issued to Carl F. W. Schramm, on Jul. 31, 1883, shows a windmill that automatically adjusts to changes in wind speed.

U.S. Pat. No. 717,939, issued to Luis Soria Y Hernandez, on Jan. 6, 1903, shows a wind turbine rotating on a wheeled base.

U.S. Pat. No. 1,015,416, issued to Judson A. Bennett, on Jan. 23, 1912, shows a frame structure which supports both ends of a horizontal shaft on which is mounted a windmill's vanes. The center post remains fixed as the outer corners follow a circular track to allow rotation.

U.S. Pat. No. 1,233,232, issued to Albert H. Heyroth, on Jul. 10, 1917, U.S. Pat. No. 1,944,239, issued to Hermann Honnef, on Jan. 23, 1934, and British Patent Document No. 507,555, issued to Clement Lean, on Jul. 13, 1939, show use of a rim of a blade structure, in conjunction with a fixed stator section, to generate electricity.

U.S. Pat. No. 4,323,331, issued to Schachle et al., on Apr. 6, 1982, shows a frame structure in which a turbine support is rotatably mounted on a ground-based support member.

U.S. Pat. No. 4,364,708, issued to Constant V. David, on Dec. 21, 1982, shows a windmill having adjustable blades.

None of the above inventions and patents, taken either singly or in combination, is seen to describe the instant invention as claimed.

SUMMARY OF THE INVENTION

A horizontal axis wind turbine, according to the present invention, comprises a rotor-supporting framework, a multi-vaned rotor, an electricity-generating stator, and a rotation track. The supporting framework is constructed with a plurality of triangular sub-units. The rotor has a plurality of vanes projecting from a central hub rotatably mounted on the supporting framework. The vanes have adjustable pitch and are encircled by a rim having a plurality of magnets. Wind induces rotation of the rim. The stator is essentially stationary and is mounted on supports that attach the stator to the framework opposite the rim. The supports on which the stator is mounted adjust to ensure a constant distance between the rim and the stator, regardless of movement of the rim. The attraction between the rotor rim magnets and the stator maintains the stator in alignment with the rotor. The stator is able to move into alignment with the rotor because the supports flex but remain parallel to the rotor axis. This is a major feature of the present invention. As magnets on the rotating rim pass by the stator, electricity is generated. The framework is mounted on the rotation track so that the framework can continually be adjusted to maximize wind-induced rotation of the rotor.

Accordingly, it is a principal object of the invention to provide a wind-driven electrical generator with minimal mechanically inter-engaging parts.

It is another object of the invention to provide stator supports that adjust to maintain a constant distance and alignment between mobile magnets and a stator.

It is a further object of the invention to use a plurality of spokes to ensure a rigid rim for maintaining positions of each vane of a plurality of vanes projecting from a rotor.

Still another object of the invention is to provide a simple yet sturdy, adjustable frame work for supporting a rotor and stator of a wind turbine.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
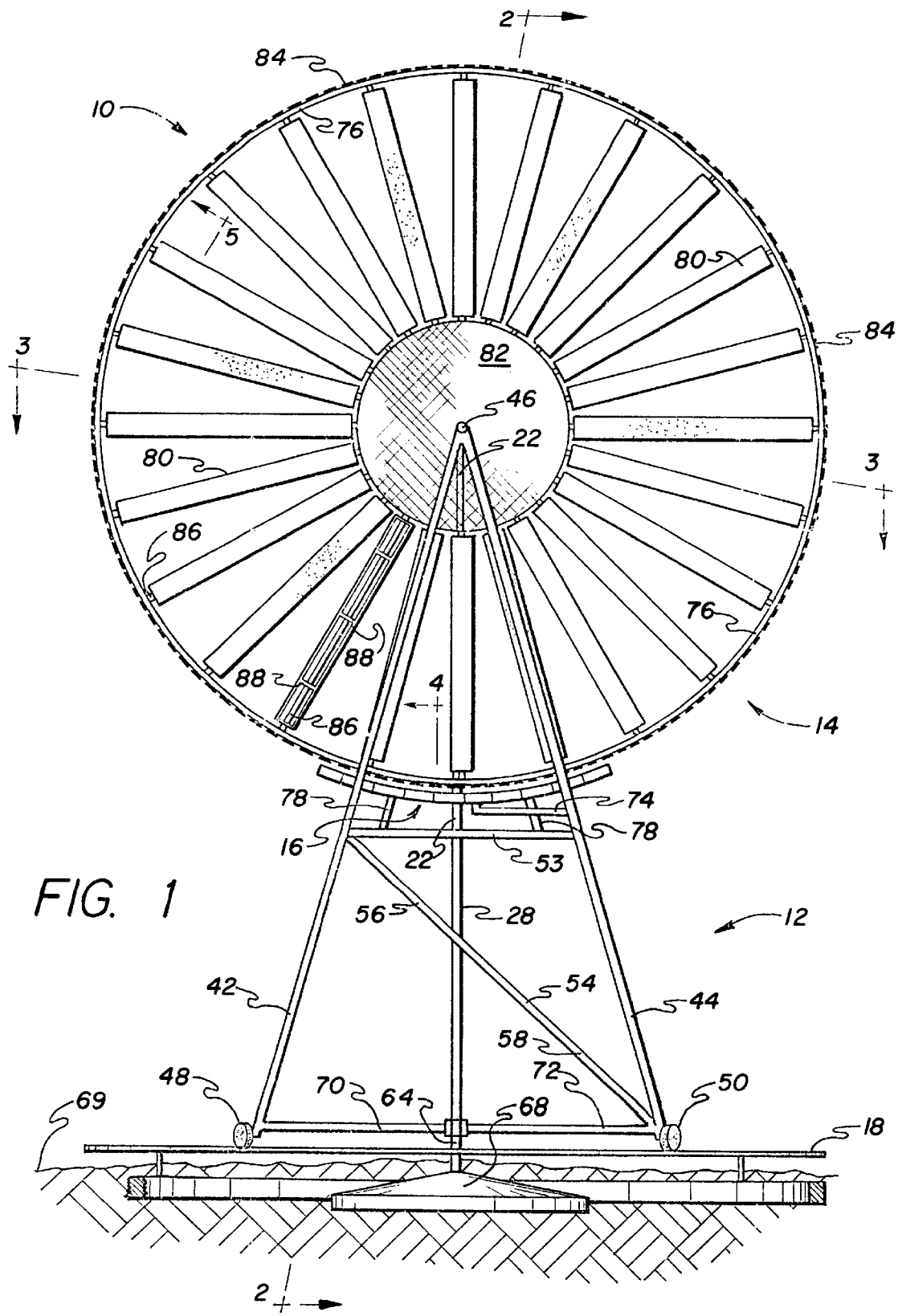
FIG. 1 is a front elevational view of the present invention, shown with portions of the invention projecting below the surface of the earth.
Figure 2:
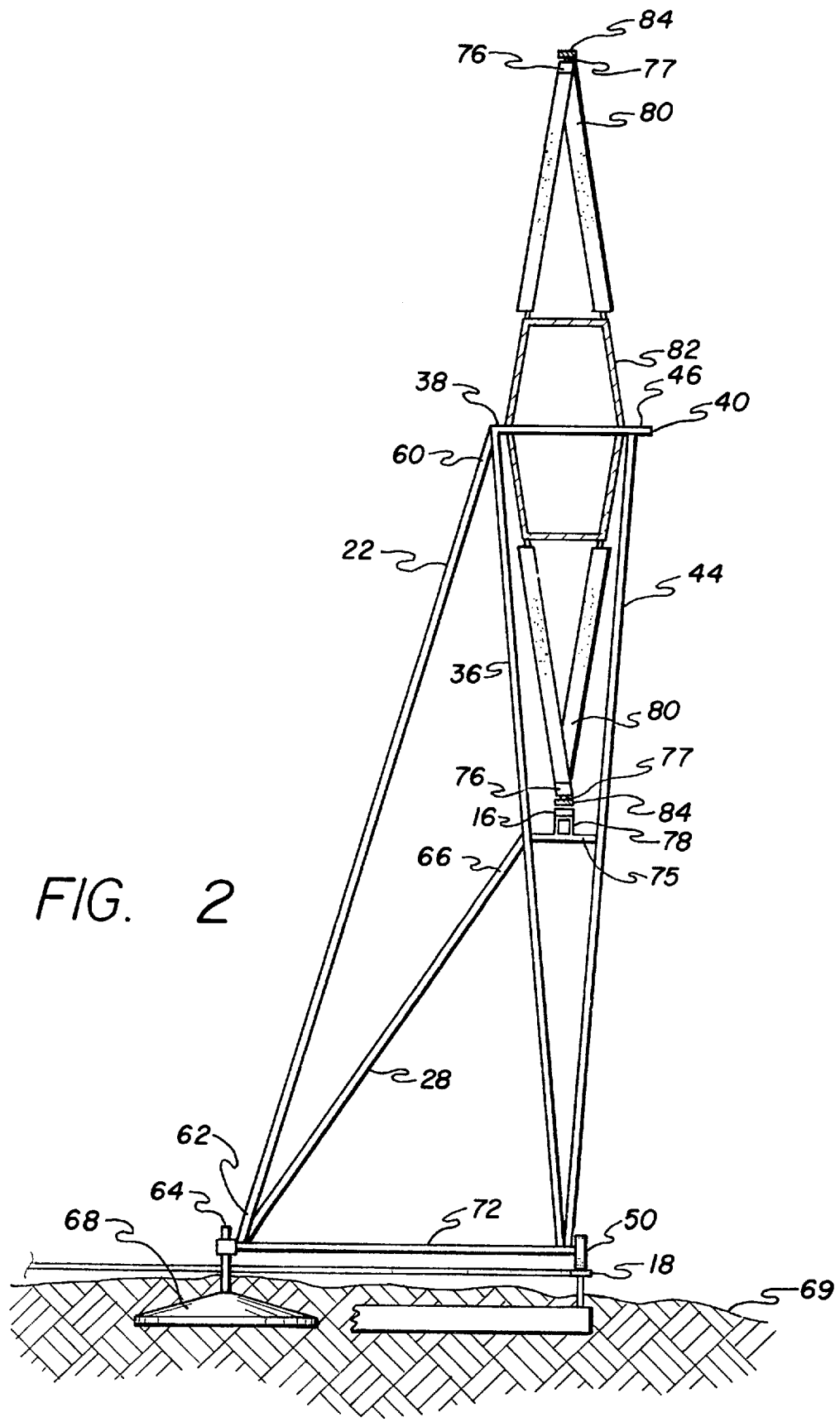
FIG. 2 is a side section view of the present invention.
Figure 3:
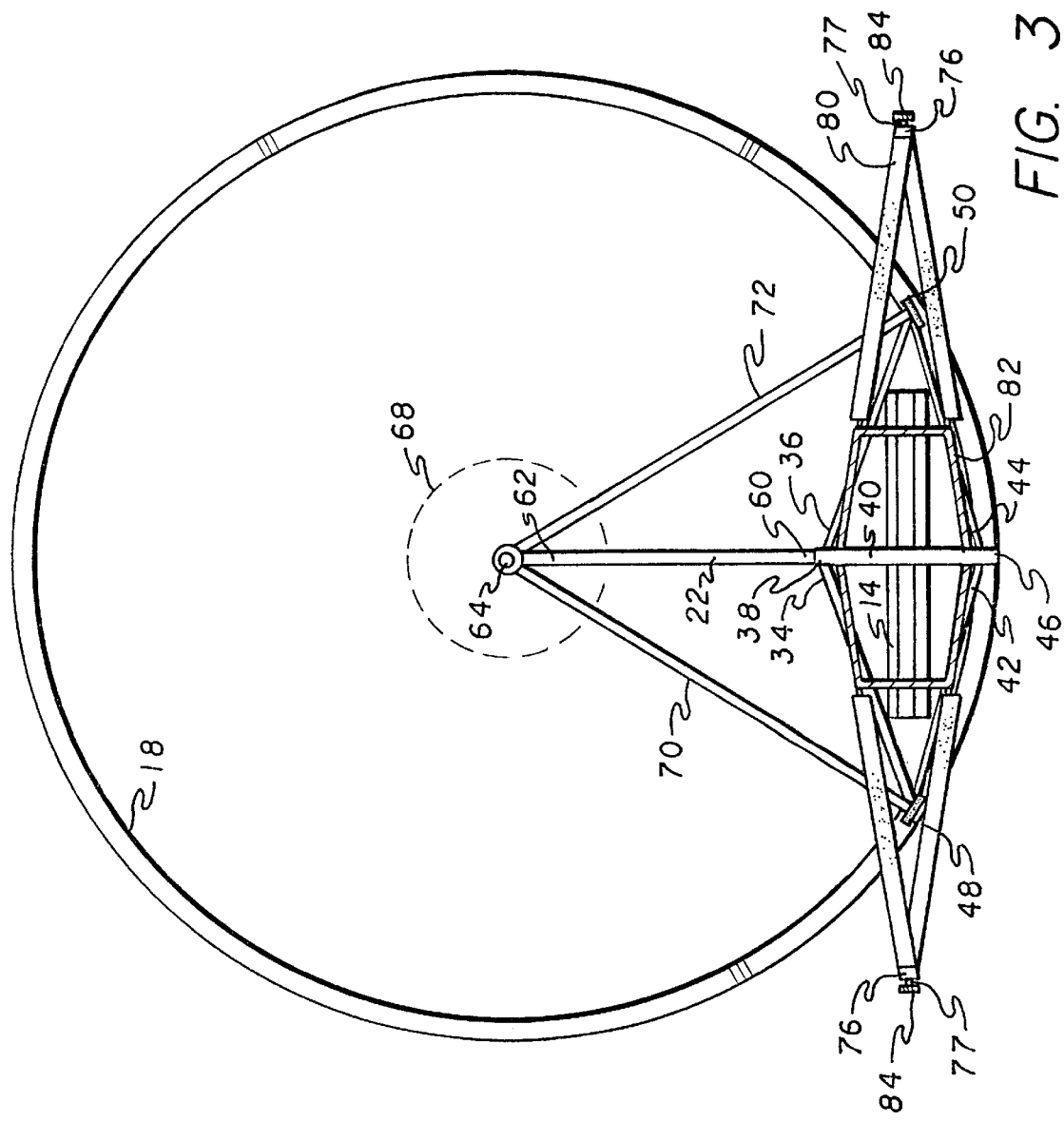
FIG. 3 is a top section view of the present invention.
Figure 4:
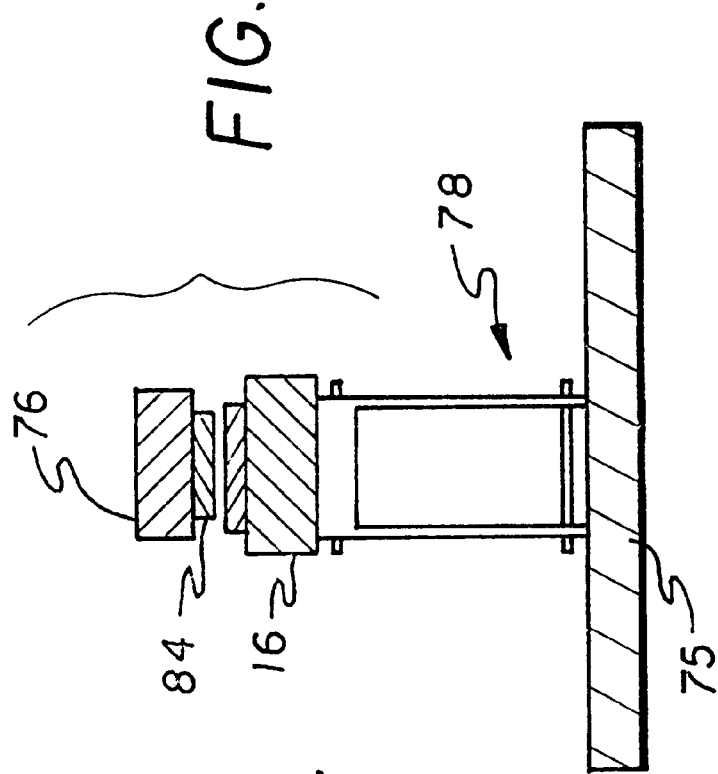
FIG. 4 is a detail section view of a rim-stator-framework region of the present invention.
Figure 5:
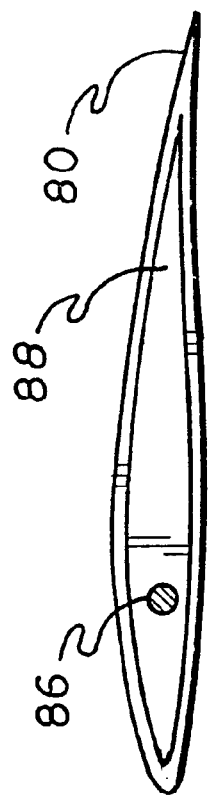
FIG. 5 is a section view of a vane and a spoke on which the vane is mounted.

The present invention is a horizontal axis wind turbine that minimizes mechanical wear, simplifies wind turbine construction, and provides mechanisms for ensuring consistent spacing between rotated magnets and an electricity-generating stator, despite flexing effects of wind, and attractive forces of the magnets on the stator.

Referring to the drawings, a horizontal axis wind turbine 10 according to the present invention comprises a rotor-supporting framework 12, a multi-vaned rotor 14, an electricity-generating stator 16, and a rotation track 18.

The rotor-supporting framework 12, includes a plurality of triangular sub-units formed by structural members. More specifically, there are at least five vertical leg members, including a major rear leg member 22, two middle leg members 34, 36, and two forward leg members 42, 44. Optionally and preferably, there is also a minor rear leg member 28. Each leg member is thin, elongated and composed of a sturdy, durable, light-weight material of known type. In one embodiment, each leg member is a piece of standard, thin-walled steel tubing. Each leg member also has a top end T and a bottom end B. A first one 34 of the middle leg members joins a second one 36 of the middle leg members at the top ends T thereof. The top ends T of the middle leg members 34, 36 support a rear end 38 of a hub-shaft 40 rotatably disposed on and connected by known means to the top ends T of the middle leg members 34, 36. A first one 42 of the forward leg members joins a second one 44 of the forward leg members at the top ends T thereof. The top ends T of the forward leg members 42, 44 support a forward end 46 of the hub-shaft 40 rotatably disposed on and connected by known means to the top ends T of the forward leg members 42, 44.

The bottom end B of the first one 34 of the middle leg members is connected to the bottom end B of the first one 42 of the forward leg members, and at this connection, there is disposed a first rotatable wheel 48 dimensioned and configured to engage the rotation track 18. The bottom end B of the second one 36 of the middle leg members is connected to the bottom end B of the second one 44 of the forward leg members, and at this connection, there is attached and disposed a second rotatable wheel 50 dimensioned and configured to engage the rotation track 18.

Two horizontal strengthening members 52, 53 are connected to and disposed centrally between the middle leg members 34, 36 and the forward leg members 42, 44, respectively. Two angled strengthening members 54 each having a first end 56 and a second end 58 are connected to and disposed between the middle leg members 34, 36 and the forward leg members 42, 44. The first ends 56 of the angled strengthening members 54 are connected to the first one 42 of the front leg members and the first one 34 of the middle leg members, respectively, at about the same place as the horizontal strengthening members 52, 53 are connected. The second ends 56 of the angled strengthening members 54 are connected to the second one 44 of the front leg members and the second one 36 of the middle leg members, respectively, at about the same place as the second rotatable wheel 50 is attached.

The major rear leg member 22 is connected at a first end 60 to the top ends T of the two middle leg members 34, 36, and a second end 62 of the major rear leg member 22 is rotatably connected to a central turbine rotation shaft 64. The minor rear leg member 28 is connected at a first end 66 to a central point (not shown) on a rear horizontal strengthening member 52, and a second end of the minor rear leg member 28 is rotatably connected to the central turbine rotation shaft 64. Various further strengthening members (not shown) may be disposed between the major rear leg member and the middle leg members, or between other members of the framework.

Because of the rotatable connection of the framework 12 with the rotation shaft 64, and the rotatable nature of the wheels 48 and 50 that engage the rotation track 18, the framework 12 can continually be adjusted to maximize wind-induced rotation of the rotor 14. This adjustment is accomplished by a linkage or control system of known type (not shown).

The rotation shaft 64 is connected to a heavy central anchor member 68 of known type that is disposed centrally with respect to the rotation track 18. The anchor member 68 is supported by or imbedded in ground 69. Two horizontal base members 70, 72 are connected between the rotation shaft 64 and the bottom ends B of the middle leg members 34, 36 and the forward leg members 42, 44. These base members 70, 72 further strengthen the framework 12.

There is at least one front-back stator support mechanism 74 mounted on the framework 12, such as on the forward 42, 44 and/or middle 34, 36 leg members, for providing support to the stator 16, the front-back stator support mechanism 74 being dimensioned and configured to flex in directions parallel with the rotor 14, while maintaining the stator 16 a constant distance from a rim 76. There is also at least one side-side stator support mechanism 78, preferably two, mounted on the framework 12, such as on one or both of the horizontal strengthening members 52, 53 or on horizontal stator support members 75. The two horizontal stator support members 75 are positioned between horizontal strengthening members 52, 53 so as to provide a greater structural integrity. This side—side stator support mechanism 78 provides support to the stator 16, and is dimensioned and configured to flex in directions parallel with the rim 76, while maintaining the stator a constant distance from the rim 76.

The multi-vaned rotor 14 includes a plurality of vanes 80 projecting from a hub 82 rotatably mounted on the hub shaft 40. The hub 82 may be left open so that the wind can blow through it, as shown, or the hub 82 may be left closed so that the wind will blow around it through the vanes 80. Together, the vanes 80 are encircled by the rim 76, which has a plurality of magnets 84 disposed outside the rim 76, relative to the vanes 80. In the preferred embodiment, thin steel shims 77 are disposed between the magnets 84 and the rim 76. The vanes 80 have adjustable pitch. Preferably, there are as many vanes 80 as practicable in order to reduce the necessary stiffness and therefore weight and cost of the rim 76. The number and width of the vanes 80 can be varied to maximize the efficiency of the wind turbine 10 for the wind envelope of the area.

There is a plurality of spokes 86 equal in number to the plurality of vanes 80 on the hub 82 mounted on the hub shaft 40. The plurality of spokes 86 is connected to and tensioned between the hub 82 and the rim 76, with the vanes 80 mounted on the spokes 86. The vanes 80 are dimensioned and configured to rotate about the spokes 86 and thus the vanes 80 have adjustable pitch. Pitch of the vanes 80 is controlled by a linkage of known type (not shown). Preferably, the vanes 80 are substantially hollow and are constructed of light-weight, durable material, such as fiberglass and sheet metal. Ribs 88 disposed in the vanes 80 support the vanes 80 and ensure proper spatial relationship between the spokes 86 and the vanes 80.

The electricity-generating stator 16 is attached to the framework 12 opposite the rotating rim 76, whereby the plurality of magnets 84 on the rotating rim 76 pass by the stator 16, when wind induces rotation of the rotor 14, thereby generating electricity by induction. In order to maintain proper control of the spatial relationship between the stator 16 and the rotor 14, it is desirable that the stator 16 not circumscribe more than ninety degrees of the rim 76. Preferably, the stator circumscribes less than forty-five degrees of the rim 76.

It is important to maintain a constant voltage, regardless of what wind load is impinging on the vanes. One way to maintain constant voltage is to vary the spatial orientation of the stator 16 with respect to the rotor 14 according to variations in the wind load. Specifically, the stator 16 can be moved away from the rotor 14 in order to decrease voltage output, and, conversely, moved closer to the rotor 14 in order to increase voltage. In this case, the stator 16 is dimensioned and configured to selectively move nearer to and farther from the rim 76 (and magnets 84) of the rotor 14.

Alternately, it is possible to have a plurality of taps (not shown), each tap connected to different portions of induction windings (not shown) in the stator 16, so that each tap (not shown) produces a different voltage. Then, as wind loads varies, a tap (not shown) having the desired voltage is selected by known means, and voltage is thus maintained at an approximately constant level.

It is to be understood that the present invention is not limited to the sole embodiment described above, but encompasses any and all embodiments within the scope of the following claims.

What is claimed is:

1. A horizontal axis wind turbine comprising:
    a rotor-supporting framework,
    a rotor supported by said framework, said rotor including,
        a plurality of vanes,
        a rim encircling said vanes, and
        a plurality of magnets secured to said rim;
    a stator; and
    a stator support mechanism attaching said stator to said framework opposite said rim, said stator support mechanism including flex means for maintaining said stator and said rim of the rotor in alignment during movement of said rim.

2. The horizontal axis wind turbine according to claim 1, further including:
    a plurality of spokes equal in number to said plurality of vanes; and
    a generally circular hub rotatably mounted on a shaft, said plurality of spokes being connected to and tensioned between said hub and said rim, said vanes being mounted on said spokes.

3. The horizontal axis wind turbine according to claim 1, where each of said vanes has an adjustable pitch.

4. A horizontal axis wind turbine according to the present invention comprising:
    a rotor-supporting framework including a major rear leg member, two middle leg members, two forward leg members, and a minor rear leg member, each leg member having a top end and a bottom end, a first one of said middle leg members joining a second one of said middle leg members at said top ends thereof, said top ends of said middle leg members supporting a rear end of a hub-shaft rotatably disposed on and connected to said top ends of said middle leg members, a first one of said forward leg members joining a second one of said forward leg members at said top ends thereof, said top ends of said forward leg members supporting a forward end of said hub-shaft rotatably disposed on and connected to said top ends of said forward leg members, said bottom end of said first one of said middle leg members being connected to said bottom end of said first one of said forward leg members, a first rotatable wheel disposed at said bottom end of said first one of said forward leg members, said bottom end of said second one of said middle leg members being connected to said bottom end of said second one of said forward leg members, a second rotatable wheel being disposed at said bottom end of said second one of said forward leg members, two horizontal strengthening members being connected to and disposed centrally between said middle leg members and said forward leg members, two horizontal stator support members positioned between said horizontal strengthening members, two angled strengthening members each having a first end and a second end and being connected to and disposed between said middle leg members and said forward leg members, said first ends of said angled strengthening members being connected to said first one of said forward leg members and said first one of said middle leg members, respectively, at substantially where said horizontal strengthening members are connected, said second ends of said angled strengthening members being connected to said second one of said forward leg members and said second one of said middle leg members, respectively, at about where said rotatable wheel is attached, said major rear lea member being connected at a first end thereof to said top ends of said two middle leg members, and a second end of said major rear leg member being rotatably connected to a central turbine rotation shaft, said minor rear leg member being connected at a first end to a central point on a rear one of said horizontal strengthening members, and a second end of said minor rear leg member being rotatably connected to said central turbine rotation shaft;

a multi-vaned rotor, including a plurality of vanes projecting from a hub rotatably mounted on said hub shaft, said vanes being encircled by a rim having a plurality of magnets, said magnets being connected to said rim by thin steel shims, said rotor further including a plurality of spokes equal in number to said plurality of vanes on said hub mounted on said hub shaft, said plurality of spokes being connected to and tensioned between said hub and said rim, with said vanes mounted on said spokes, said vanes being dimensioned and configured to rotate about said spokes thereby having adjustable pitch, said vanes being substantially hollow and constructed of light-weight, durable material, selected from fiberglass and sheet metal, said vanes having ribs disposed in said vanes, said ribs supporting said vanes and ensuring proper spatial relationship between said spokes and said vanes;

a rotation track, said rotation shaft being connected to a heavy central anchor member disposed centrally with respect to said rotation track, two horizontal base members being connected between said rotation shaft and said bottom ends of said middle leg members and of said forward leg members, whereby said base members further strengthen said framework, said framework being mounted, via said wheels on said rotation track whereby said framework is continually adjusted to maximize wind-induced rotation of said rotor;

an electricity-generating stator attached to said framework opposite said rim, whereby said plurality of magnets on said rim pass by said stator, when wind induces rotation of said rotor, thereby generating electricity by induction, said stator circumscribing about forty-five degrees of said rim, said stator being dimensioned and configured to selectively move nearer to and farther from said rim of said rotor;

at least one front-back stator support mechanism mounted on said forward and middle leg members, said front-back stator support mechanism being dimensioned and configured to flex for maintaining alignment of said stator with said rim during movement of said rim; and at least one side-side stator support mechanism mounted on said horizontal stator support members, said side-side stator support mechanism being dimensioned and configured to flex for maintaining alignment of said stator With said rim during movement of said rim.

* * * * *